United States Patent [19]

Sadamitsu et al.

[11] Patent Number: 4,706,713

[45] Date of Patent: Nov. 17, 1987

[54] FLEXIBLE COMPOSITE PIPE FOR HIGH-TEMPERATURE FLUIDS

[75] Inventors: Kazuo Sadamitsu, Yamato; Yoshiyuki Makino, Ichihara, both of Japan

[73] Assignee: Furukawa Electric Co., Ltd., Tokyo, Japan

[21] Appl. No.: 935,125

[22] Filed: Nov. 26, 1986

Related U.S. Application Data

[63] Continuation of Ser. No. 746,247, Jun. 18, 1985.

[30] Foreign Application Priority Data

Jun. 20, 1984 [JP] Japan ................................ 59-125015
Mar. 25, 1985 [JP] Japan ............................ 60-41476[U]

[51] Int. Cl.$^4$ ........................................... F16L 11/00
[52] U.S. Cl. .................................... 138/137; 138/129
[58] Field of Search ............... 138/137, 138, 140, 129, 138/130

[56] References Cited

U.S. PATENT DOCUMENTS

| | | | |
|---|---|---|---|
| 916,136 | 3/1909 | Ford ..................................... | 138/137 |
| 3,233,024 | 2/1966 | Jackson et al. ..................... | 138/137 |
| 3,604,461 | 9/1971 | Matthews ............................ | 138/130 |
| 4,041,207 | 8/1977 | Takada et al. ...................... | 138/137 |
| 4,330,017 | 5/1982 | Satoh et al. ......................... | 138/137 |
| 4,343,333 | 8/1982 | Keister ................................. | 138/130 |
| 4,344,462 | 8/1982 | Aubert et al. ....................... | 138/129 |
| 4,353,763 | 10/1982 | Simons ................................ | 138/141 |
| 4,402,346 | 9/1983 | Cheetham et al. .................. | 138/138 |

FOREIGN PATENT DOCUMENTS

| | | |
|---|---|---|
| 0045632 | 7/1981 | European Pat. Off. . |
| 0111169 | 11/1983 | European Pat. Off. . |
| 1957168 | 6/1970 | Fed. Rep. of Germany . |
| 7916799 | 10/1979 | Fed. Rep. of Germany . |
| 59-45385 | 3/1984 | Japan . |
| 59-45386 | 3/1984 | Japan . |

*Primary Examiner*—Henry J. Recla
*Assistant Examiner*—L. J. Peters
*Attorney, Agent, or Firm*—Frishauf, Holtz, Goodman & Woodward

[57] ABSTRACT

A flexible composite pipe for transporting a high-temperature fluid of the invention has an inner pipe for passing a high-temperature, high-pressure fluid therethrough, a reinforcing layer formed around the inner pipe, and a protective sheath layer formed around the reinforcing layer. The inner pipe consists of a material which is selected from a polyvinylidene fluoride copolymer resin, a blend thereof with a polyvinylidene fluoride resin, or a composition based on the polyvinylidene fluoride copolymer resin and which has, when hot pressed into a sheet, an Izod impact strength of 10 kg-cm/cm or more and an apparent Young's modulus in tension of 90 kg/mm$^2$ or less.

3 Claims, 4 Drawing Figures

FLEXIBLE COMPOSITE PIPE FOR HIGH-TEMPERATURE FLUIDS

This application is a continuation, of application Ser. No. 746,247, filed June 18, 1985.

BACKGROUND OF THE INVENTION

The present invention relates to a flexible composite pipe for transporting oil, water or gas.

Iron pipes are mainly used for transporting oil or gas from submarine oilfields. However, flexible composite pipes are not receiving much attention due to easy laying.

For example, one type of flexible composite pipe is commercially available from Coflexip Corp, France. The composite pipe has a nylon inner pipe, Z-shaped reinforcing strips of small pitch and flat reinforcing strips of large pitch wound around the inner pipe, and a plastic outer sheath. This type of composite pipe is used for transporting crude oil or gas from many submarine oilfields. However, the temperature of oil flowing out from an oil well frequently exceeds 100° C. When a composite pipe of this type is used at such an oilfield site, oil leakage occurs within a short period of time from pipe laying.

In conventional nylon inner pipes, 100° C. is considered as the upper temperature limit, and a long pipe life cannot be guaranteed if the pipe is continuously exposed to this level of temperature. When oil to be transported contains water, even if the oil temperature is reasonably low, hydrolysis of the nylon resin occurs and the resin is degraded within a short period of time.

Heat-resistant resins to replace nylon resins generally include fluorine containing plastics and various engineering plastics. However, none of such resins satisfies all the requirements as to elongation, stress cracking and the like in order to manufacture high-temperature, high-pressure flexible transport pipes.

More specifically, polyvinylidene fluoride resins are known to have excellent extrudability, heat-resistance and chemical resistance and are used for pipe lining and for solid pipes. However, such resins have not been applied in the manufacture of flexible pipes, excluding extremely small diameter pipes.

The reason can be attributed to the high rigidity of polyvinylidene fluoride resins. When such a resin is used for purposes of the present invention, as the pipe is cut with a saw or the like in a bent state or in a straightened state after having been bent, cracks run for several tens of meters, particularly in wintertime, due to low temperatures. For this reason, polyvinylidene fluoride resins cannot be used in practice.

Cracking of polyvinylidene fluoride resins is also considered to be attributable to a high molding shrinkage of the resins and resultant large residual strain of a formed body, in addition to inherent high rigidity. In order to confirm this consideration, a pipe was manufactured by extrusion coating a polyvinylidene fluoride resin directly on a flexible interlocked metal pipe obtained by interlocking metal strips. When a notch was formed in the pipe, crack propagation from the notch was observed. It was demonstrated as a result of this test that cracks were formed from the recessed portions (projections in the resin formed body) at the engaging portions of the metal strips of the interlocked pipe.

SUMMARY OF THE INVENTION

It is a main object of the present invention to provide a flexible composite pipe for use at high temperatures and high pressures.

It is another object of the present invention to provide a flexible composite pipe which can be used at high temperatures and which does not allow propagation of cracks upon being bent or upon formation of notches.

It is still another object of the present invention to provide a high-temperature, high-pressure flexible composite pipe which does not cause extension of an inner pipe into surrounding reinforcing strips at high temperatures, so that the pipe can be used over a long period of time.

It is still another object of the present invention to provide a high-temperature, high-pressure flexible composite pipe which is not influenced by being bent repeatedly.

The present invention has been established based on various studies and tests including the one described above by the present inventors and provides a fluid transport pipe consisting of an inner pipe for allowing passage therein of a desired fluid at a high temperature and at a high pressure, a reinforcing layer formed around the inner pipe, and a protective sheath layer coated around the reinforcing layer, the inner pipe being obtained by extruding a polyvinylidene fluoride copolymer resin, a blend thereof with a polyvinylidene fluoride resin or a composition based on the polyvinylidene fluoride copolymer resin which has, when hot-pressed into a sheet, an Izod impact strength of 10 kg-cm/cm or more and an apparent Young's modulus in tension of 90 kg/mm$^2$ or less.

DETAILED DESCRIPTION OF THE PREFERRED EMBODIMENTS

Figure 1:
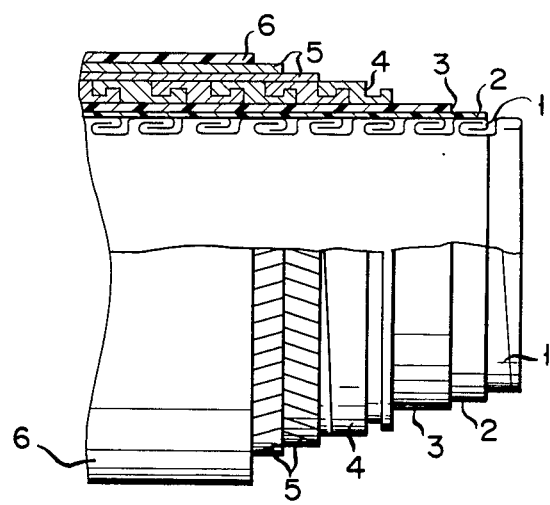
FIG. 1 is a side view of a flexible composite pipe according to an embodiment of the present invention, wherein the upper half is shown in section and the lower half is shown to expose each different layer of the pipe.

In the first embodiment shown in FIG. 1, an inner pipe 3 is arranged around a resin tape layer 2 formed by winding a resin tape around an interlocked pipe 1 of steel or stainless steel. Reinforcing layers 4 and 5 and a protective sheath layer 6 are formed around the inner pipe 3. The inner reinforcing layer 4 is formed by winding Z-shaped metal strips at a short pitch such that they are interlocked with each other. The outer reinforcing layer 5 consists of two layers of flat metal strips which are wound at a long pitch and in opposite directions.

Figure 2:
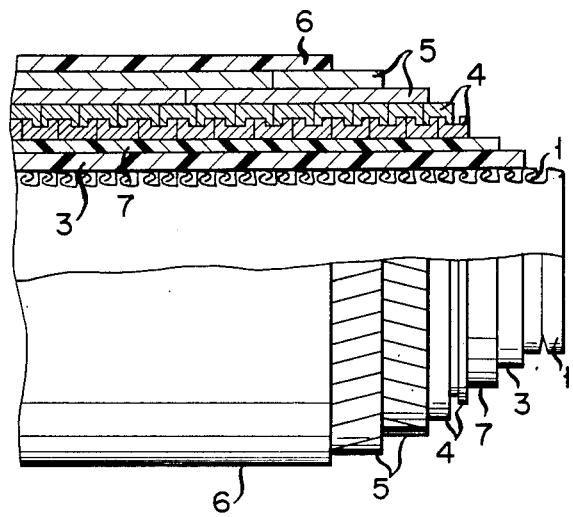
FIG. 2 is a side view of a flexible composite pipe according to another embodiment of the present invention, wherein the upper half is shown in section and the lower half is shown to expose each different layer of the pipe.
Figure 3:
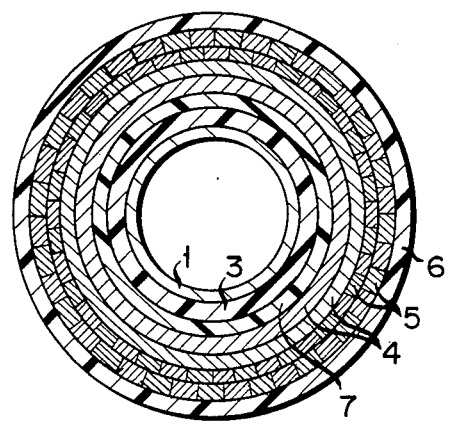
FIG. 3 is a cross-sectional view of the composite pipe shown in FIG. 2.

In another embodiment of the present invention shown in FIG. 2, an inner pipe 3 is directly coated on a steel or stainless steel interlocked pipe 1. An outer layer 7 of a resin having a rigidity at high temperatures which is higher than that of a resin of the inner pipe 3 is formed therearound. Inner and outer reinforcing layers 4 and 5 are formed around the outer layer 7. The inner reinforcing layer 4 comprises two interlocked layers of U-shaped steel strips. The outer reinforcing layer 5 comprises two layers of flat steel strips. A plastic protective sheath layer 6 is formed as an outermost layer.

The inner pipe 3 comprises an extruded pipe of a resinous material which has, when hot pressed into a sheet, an Izod impact strength of 10 kg-cm/cm or more and an apparent Young's modulus in tension of 90 kg/mm$^2$ or less. The resinous material is a polyvinylidene fluoride copolymer resin, a blend thereof with a polyvinylidene fluoride resin, or a composition based on the polyvinylidene fluoride copolymer resin.

According to the present invention, the inner pipe consists of one of the above-mentioned resinous materials for the following reasons. When a resinous material has an Izod impact strength lower than 10 kg-cm/cm, the pipe has too low an impact strength. When the apparent Young's modulus in tension exceeds 90 kg/mm$^2$, cracking or tearing occurs.

The "polyvinylidene fluoride copolymer resin" used herein is a resin mainly consisting of a vinylidene fluoride monomer and obtained by copolymerizing one or more of comonomers such as tetrafluoro ethylene monomer, 3-fluoro-1-chloro ethylene monomer, or hexafluoro propylene monomer. A copolymer consisting of 5 to 10% mole of hexafluro propylene monomer and the balance of vinylidene fluoride is particularly preferable due to its good physical properties.

When the material to be used for the inner pipe is defined above, the Izod impact strength of the material is defined as that of a sample piece of a sheet obtained by hot pressing the material. This is because preparation of this sample piece by hot pressing is easy and relatively small measurements are obtained when the hot pressed sheet is subjected to measurement.

In a fluid transport composite pipe according to the present invention, a flexible interlocked metal pipe 1 obtained by interlocking metal tapes is inserted within the inner pipe 3. When the composite pipe is intended for use at a location where high pressure resistance is required, e.g., deep sea, the interlocked metal pipe preferably has a plastic tape layer 2 wound therearound.

The reason for this is as follows. The interlocked portions of the metal tapes are in recessed form. When an inner pipe is directly extruded around the metal pipe having such recessed interlocked portions, the inner pipe material extends into the recessed portions. Then, depending upon the type of the inner pipe material, the thickness of the inner pipe and the like, the extended parts of the inner pipe at the recessed interlocked portions may be sources of cracking or the like in the inner pipe.

The reinforcing layers 4 and 5 formed around the inner pipe 3 according to the present invention impart a resistance to internal pressure of the composite pipe. The layers 4 and 5 normally comprise tapes, bands, strips or wires of metal or reinforced plastics, i.e., thin, narrow and elongated elements of tough pliable material, either flat or interlocking like the metal bands illustrated in FIGS. 1 and 2 for the layer 4.

When the reinforcing layers comprise at least one reinforcing layer obtained by winding a profile strip at a short pitch and at least two reinforcing layers wound at a long pitch in opposite directions, the former reinforcing layer imparts a resistance to internal pressure mainly along the circumferential direction of the composite pipe, while the latter two reinforcing layers impart a resistance to internal pressure along the axial direction of the composite pipe.

As described above, an inner pipe is obtained from a resinous material having, when hot pressed into a sheet, an Izod impact strength of 10 kg-cm/cm or more and an apparent Young's modulus in tension of 90 kg/mm$^2$ or less. The resinous material is a polyvinylidene fluoride copolymer resin, a blend thereof with a polyvinylidene fluoride resin, or a composition based on the polyvinylidene fluoride copolymer resin. Reinforcing layers and an outer protective sheath layer are formed around the inner pipe to provide a flexible composite pipe resistant to high temperatures and high pressures. When the thickness of strips used for the reinforcing layer is large or when the composite pipe is expected to be exposed to repeated bending stress, an outer layer 7 consisting of a resin having a rigidity at high temperatures which is higher than that of the resin of the inner pipe 3 at the same temperature is preferably formed therearound.

The reason for this is as follows. Although a polyvinylidene fluoride resin has an excellent thermal stability, it has a considerably small strength at high temperatures. When a high internal pressure acts on the composite pipe, the inner pipe material extends into gaps between the surrounding reinforcing layers consisting of wires, thereby forming projections. When the composite pipe is subjected to bending stress in this state, stress concentration occurs at the proximal portions of the projections, causing cracking of the inner pipe or separation of the projections.

In view of this problem, the outer layer serves to prevent the polyvinylidene fluoride resin from extending into the gaps between the reinforcing layers. The outer layer according to the present invention can be formed by directly extruding a polyamide resin such as nylon 6, nylon 6—6, nylon 11, nylon 12 or nylon copolymer; or a resin such as polyamide elastomer or thermoplastic polyester elastomer. The outer layer can alternatively be obtained by gap winding (edges are separated to form gaps) or lap winding (edges overlap each other) a thin metal tape or a film of polyester or nylon or a cloth material such as canvas cloth or glass tape. Preferably at least two layers of a metal such as steel, stainless steel, copper or nickel can be used as the outer layer by gap-wounding so that gaps of each layer are covered by each overlying layer.

When the high-temperature, high-pressure flexible composite pipe according to the present invention is intended for use where it is subject to repeated bending stress, it is preferable that a grease be injected in the inner and outer reinforcing layers and a plastic film be inserted therebetween.

When the composite pipe not treated as mentioned above is subject to repeated bending stress, the two reinforcing layers shift relative to each other and wear due to high internal pressure. The reinforcing layers thus undergo wear and fatigue and may be damaged.

Figure 4:
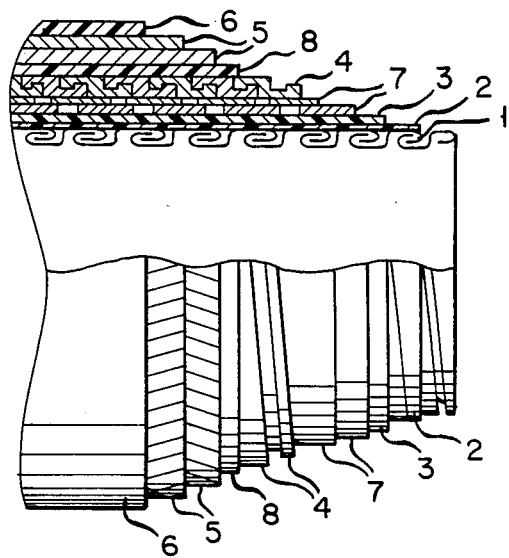
FIG. 4 is a side view partly in section showing a third embodiment of the present invention.

FIG. 4 shows a third embodiment in which, between the inner pipe 3 and the reinforcing layer 4, there are superposed gap-wound metal tapes, the outer tape covering the gaps of the inner tape, together constituting the layer 7. FIG. 4 also shows a plastic film 8 between the reinforcing metal strip layers 4 and 5. Grease may usefully be injected in both the metal strip reinforcing layers 4 and 5.

The present invention will now be described by way of its Examples and Comparative Examples.

EXAMPLE 1

A vinylidene fluoride monomer and 3-fluoro-1-chloro ethylene monomer were reacted in a ratio of 9:1 to obtain a polyvinylidene fluoride copolymer resin (when hot pressd into a sheet it had an Izod impact strength of 11.6 kg-cm/cm and an apparent Young's modulus in tension of 56.8 kg/mm$^2$). The copolymer resin was extruded to form an inner pipe having an inner diameter of 2 inches and a thickness of 4 m/m. Iron strips having a width of 50 mm were wound around the inner pipe to form two reinforcing layers respectively having thicknesses of 0.6 m/m and 1 m/m such that each layer had a gap distance of 5 m/m. Iron wires having a diameter of 6 m/m were wound therearound in two layers in different directions at angles of 15 degrees. A low density polyethylene was extruded therearound to a thickness of 4 m/m as a protective sheath layer to complete a composite pipe.

In the above manufacturing process, the inner pipe of the polyvinylidene fluoride copolymer resin was wound around a drum having a diameter of 1 m a total of 6 times. However, the inner pipe suffered no abnormality.

The composite pipe obtained had an internal breakdown pressure of 500 kg/cm$^2$.

COMPARATIVE EXAMPLE 1

Polyvinylidene fluoride (when hot pressed into a sheet it had an Izod impact strength of 7.2 kg-cm/cm and an apparent Young's modulus in tension of 88.2 kg/mm$^2$) was extruded into a pipe having the same size as that in Example 1 so as to manufacture a composite pipe as in Example 1. However, when the pipe was wound around the drum for the first time before winding iron strips, the pipe cracked.

EXAMPLES 2-4 & COMPARATIVE EXAMPLE 2

Resins and resin compositions of Examples 2 to 4 and Comparative Example 2 in the Table below were extrusion coated to a thickness of 3 m/m on interlocked pipes made from SUS 304 having a diameter of 1 inch. The inner pipe was bent at a radius of curvature of 22 cm to form a notch having a length of about 2 cm and propagation of cracks was checked. The obtained results are also shown in the Table below. When the pipe did not crack, the pipe was straightened and bent at a radius of curvature R of 22 cm. The bending/straightening cycle was repeated to a maximum of 20 times. The obtained results are shown together with the results of the Izod impact strength test of a separately prepared hot pressed sheet and the results of the Young's modulus in tensible test of a 1 mm thick sheet. Data on repeating time is the minimum value before crack propagation when five samples were tested.

TABLE

| | Resin (trade name) | Crack | Repeating time | Izod impact strength (kg-cm/cm) | Young's modulus in tension (kg/mm$^2$) |
|---|---|---|---|---|---|
| Example 2 | Polyvinylidene fluoride copolymer resin ("Kynar-2800" available from Pennwalt Corp., U.S.A.) | None | 20 times | 39 | 54 |
| Example 3 | Polyvinylidene fluoride copolymer ("Solef-11010" available from Solvay Co., Belgium) | None | 20 times | 16 | 60 |
| Example 4 | 1:1 blend of "Kynar-2800" with "Kynar-460" | None | 20 times | 16 | 57 |
| Comparative Example 2 | Polyvinylidene fluoride resin ("Kainer-460" available from Pennwalt Corp., U.S.A.) | Cracks formed | 0 | 5.1 | 77 |

In the Izod impact strength test, samples each had a thickness of 6 mm.

The Young's modulus in tension was determined by referring to an initial slope of a strese-strain characteristic curve (23° C.) which was obtained by punching a No. 2 dumbbell from a 1 mm thick sheet, and pulling it at a rate of 50 mm/min.

EXAMPLE 5

A polyester tape was wound in a plurality of layers to a total thickness of 0.5 m/m around the interlocked pipe having a diameter of 1 inch as in Example 2, thereby forming a plastic tape layer surrounding the recessed interlocked portions of the interlocked pipe. A polyvinylidene fluoride copolymer resin ("Foraflon 650HD" (trade name); having an Izod impact strength of 11 kg-cm/cm and an apparent Young's modulus in tension of 88 kg/mm$^2$) was extruded around the plastic tape layer to a thickness of 3 m/m to form a pipe, i.e., an inner pipe. The inner pipe was subjected to the same tests as in Examples 2 to 4 and was found to form no cracks after 20 bending cycles.

When the resin as in Comparative Example 2 was formed in a similar manner, cracks formed after 6 bending cycles.

When the polyester film or the like is wound around a flexible metal pipe, i.e., an interlocked pipe, it prevents the surrounding polyvinylidene fluoride copolymer from extending into the recessed interlocked portions of the interlocked pipe. When the polyester film or the like is wound in a plurality of layers, it provides a cushion effect. Therefore, when the pipe is bent, local strain of the resin is not caused, and residual strain is cancelled.

EXAMPLE 6

A polyester tape was wound in a plurality of layers to a total thickness of 0.5 mm around an interlocked pipe the same as that used in Example 2 except that it had a diameter of 3 inches. The same inner pipe as that used in Example 2 having a thickness of 6 m/m was arranged therearound. Steel strips having U-shaped sections (U strips) were wound in two layers such that recesses and ribs of the respective layers engaged with each other. The two layers had a total thickness of 6 m/m. Two layers of flat steel strips having a thickness of 3 mm were wound therearound at an angle of 40 degrees at opposite direction. A resin protective sheath layer consisting of a low-density polyethylene was coated.

Oil heated to a temperature of 120° C. was circulated in the composite pipe prepared in this manner. After the pipe reached equilibrium, internal pressure breakdown test was performed. The pipe broke at an internal breakdown pressure of 950 kg/cm$^2$. The pipe had a surface temperature of 50° C. when this measurement was obtained.

When an attempt was made to prepare a composite pipe as in this Example using the resin of Comparative Example 2, cracks were formed along the longitudinal direction of the pipe when the pipe was cut before the U-shaped strips 4 were wound.

EXAMPLE 7

A polyvinylidene fluoride copolymer resin ("Kynar 2800" (trade name)) was coated around an interlocked pipe made from SUS 304 having an inner diameter of 76 mm and an outer diameter of 83.5 mm to form an inner pipe having an inner diameter of 83.5 mm and an outer diameter of 89.5 mm. A thermoplastic polyester elastomer ("Hytrel 7246" (trade name)) was extrusion coated therearound to form an outer layer having an inner diameter of 89.5 mm and an outer dimeter of 95.5 mm. U-shaped steel strips (10 mm wide, 4 mm thick) were wound in two layers at a pitch of 10.5 mm so that the respective layers engaged with each other. Shell Darina #2 grease is injected in the two layers. The first reinforcing layer thus formed had an inner diameter of 95.5 mm and an outer diameter of 111.5 mm. High density polyethylene film which is 60 μm thick and 50 mm wide is wound in half lap in two layers so that the total outer diameter becomes 112.0 mm. Flat steel strips (8 mm wide, 3 mm thick) were wound therearound in two layers at pitches of 502 mm (inner layer) and 529 mm (outer layer) with high density polyethylene film wound in the same manner mentioned above between two layers and the same grease injected in the layers. The second reinforcing layer thus obtained had an inner diameter of 120.0 mm and an outer diameter of 124.5 mm. A resin protective sheath layer was finally formed to complete a composite pipe.

The composite pipe was cut into a length of 3 m and the repeated bending fatigue test of the pipe was performed. The test was performed by circulating oil at a temperature of 120° C. inside the pipe, applying an internal pressure of 210 kg/cm$^2$, and repeatedly bending the pipe at a radius of curvature of 2 m at 25 rpm. No abnormality was observed up to $1 \times 10^4$ cycles.

When oil at a temperature of 120° C. was circulated in the composite pipe of this Example and an internal pressure was applied after the sample surface temperature saturated, oil leakage occurred at an internal pressure of 1,900 kg/mm$^2$. When the composite pipe was disassembled, the thermoplastic polyester elastomer of the outer layer was observed to have extended into the first reinforcing layer in a width of 1.4 mm × depth of 0.3 mm at the location of the pipe different from that occurred oil leakage, and no other problem was noted.

What is claimed is:

1. A flexible composite pipe for transporting a high-temperature fluid, comprising:
   an inner pipe consisting of a pipe obtained by extruding one member selected from the group consisting of polyvinylidene fluoride copolymer resins, blends thereof with polyvinylidene fluoride resins, and compositions based on the polyvinylidene fluoride polymer resins, which have, when hot pressed into a sheet, and Izod impact strength of not less than 10 kg-cm/cm and an apparent Young's modulus intension of not more than 90 kg/mm$^2$;
   an inner reinforcing layer formed around said inner pipe and an outer reinforcing formed around said inner reinforcing layer, a grease being injected in said inner and outer reinforcing layers;
   a plastic film inserted between said inner and outer reinforcing layers, and
   a protective sheet layer coated around said outer reinforcing layer.

2. A flexible composite pipe according to claim 1, further comprising a layer which is formed around and in contact with said inner pipe inside of said inner reinforcing layer and which consists of a resin having a rigidity at high temperatures which is higher than that of the material of said inner pipe.

3. A flexible composite pipe according to claim 2, wherein the resin of said outer layer having a rigidity at high temperatures which is higher than that of the material of said inner pipe is one member selected from the group consisting of a polyester elastomer and a polyamide resin.

* * * * *

UNITED STATES PATENT AND TRADEMARK OFFICE
CERTIFICATE OF CORRECTION

PATENT NO. : 4,706,713
DATED : Nov. 17, 1987
INVENTOR(S) : SADAMITSU et al

It is certified that error appears in the above-identified patent and that said Letters Patent is hereby corrected as shown below:

Title page, left-hand column, the Assignee identified as "Furukawa Electric Co., Ltd," should be -- The Furukawa Electric Co., Ltd. --

Signed and Sealed this

Twentieth Day of September, 1988

Attest:

DONALD J. QUIGG

Attesting Officer

Commissioner of Patents and Trademarks